(12) United States Patent
Sehgal et al.

(10) Patent No.: US 11,954,534 B2
(45) Date of Patent: Apr. 9, 2024

(54) SCHEDULING IN A CONTAINER ORCHESTRATION SYSTEM UTILIZING HARDWARE TOPOLOGY HINTS

(71) Applicant: RED HAT, INC., Raleigh, NC (US)

(72) Inventors: Swati Sehgal, Dublin (IE); Marcel Apfelbaum, Afula (IL)

(73) Assignee: Red Hat, Inc., Raleigh, NC (US)

( * ) Notice: Subject to any disclaimer, the term of this patent is extended or adjusted under 35 U.S.C. 154(b) by 410 days.

(21) Appl. No.: 17/352,685

(22) Filed: Jun. 21, 2021

(65) Prior Publication Data

US 2022/0405135 A1 Dec. 22, 2022

(51) Int. Cl.
*G06F 9/50* (2006.01)
*G06F 9/455* (2018.01)

(52) U.S. Cl.
CPC ............ *G06F 9/505* (2013.01); *G06F 9/5061* (2013.01); *G06F 9/45533* (2013.01)

(58) Field of Classification Search
None
See application file for complete search history.

(56) References Cited

U.S. PATENT DOCUMENTS 8,972,991 B2  3/2015  Traut et al.

FOREIGN PATENT DOCUMENTS

EP   3244309 A1   11/2017

OTHER PUBLICATIONS

Yang Sijie et al: "Yun: A High-Performance Container Management Service Based on OpenStack", 2019 IEE Fourth International Conference on Data Science in Cyberspace (DSC), IEEE, Jun. 23, 2019 (Jun. 23, 2019), pp. 202-209, XP033645188, DOI: 10.1109/DSC.2019.00038.
Extended European Search Report of Application No. 21188110.7, dated Jan. 17, 2022, 10 pages.
DeySouvik. (Oct. 31, 2019). "The Scheduler should be Numa Aware and options should be given in the pod defination for the type of Numa awareness required," pp. 14.
Kubernetes. (Oct. 19, 2020). "Control Topology Management Policies on a node," pp. 6.
Viasat/Github, (Nov. 12, 2015). "Viasat/nhd," pp. 8.
Kubernetes. (Feb. 17, 2021). "Kubernetes Scheduler," pp. 2.

*Primary Examiner* — Eric C Wai
(74) *Attorney, Agent, or Firm* — Womble Bond Dickinson (US) LLP

(57) ABSTRACT

A request to execute a workload that utilizes an amount of resources to be executed is received from a client device. Corresponding resources that are available at multiple non-uniform memory access (NUMA) nodes are received from one or more host systems. A particular NUMA node of the multiple NUMA nodes is identified in view of the particular NUMA node having available resources that are greater than the amount of resources to execute the workload. A scheduling hint is assigned to the workload that indicates that the particular NUMA node is to be used to execute the workload.

20 Claims, 12 Drawing Sheets

1000

1010 RECEIVE, FROM A SCHEDULING SYSTEM, ONE OR MORE CONTAINERS ASSOCIATED WITH A WORKLOAD TO BE EXECUTED BY A HOST SYSTEM, THE HOST SYSTEM COMPRISING A PLURALITY OF NON-UNIFORM MEMORY ACCESS (NUMA) NODES AND THE ONE OR MORE CONTAINERS COMPRISING A SCHEDULING HINT INDICATING A NUMA NODE OF THE PLURALITY OF NUMA NODES THAT IS TO EXECUTE THE WORKLOAD

1020 ASSIGN THE ONE OR MORE CONTAINERS TO THE NUMA NODE IN VIEW OF THE SCHEDULING HINT

1110 RECEIVING, FROM A SCHEDULING SYSTEM, A WORKLOAD TO BE EXECUTED BY A HOST SYSTEM, THE HOST SYSTEM COMPRISING A PLURALITY OF HARDWARE PARTITIONS AND THE WORKLOAD COMPRISING A SCHEDULING HINT INDICATING A HARDWARE PARTITION OF THE PLURALITY OF HARDWARE PARTITIONS THAT IS TO EXECUTE THE WORKLOAD

1120 BINDING, BY THE HOST SYSTEM, THE WORKLOAD TO THE HARDWARE PARTITION IN VIEW OF THE SCHEDULING HINT

FIG. 11

SCHEDULING IN A CONTAINER ORCHESTRATION SYSTEM UTILIZING HARDWARE TOPOLOGY HINTS

TECHNICAL FIELD

Aspects of the present disclosure relate to a container-orchestration system, and more particularly, to improving scheduling in a container orchestration system utilizing hardware topology hints.

BACKGROUND

Some container-orchestration systems include one or more containers that may contain one or more workloads. An example of a workload is a container image, which can encompass a containerized application, its corresponding runtime environment, or a combination thereof. In one scenario, a component of a container-orchestration system known as a scheduler, uses a process called scheduling, to select resources of a host system to run (e.g., execute, etc.) one or more workloads. A scheduler may monitor a container-orchestration system to discover one or more workloads in the container-orchestration system that are not assigned to and run by or on resources of any host systems in the container-orchestration system.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

FIG. 10 is a flow diagram of a method of a host system assigning containers associated with a workload to a non-uniform memory access (NUMA) node in view of a scheduling hint, in accordance with some embodiments FIG. 11 is a flow diagram of a method of a host system binding a workload to a hardware partition in view of a scheduling hint, in accordance with some embodiments.

DETAILED DESCRIPTION

Figure 1:
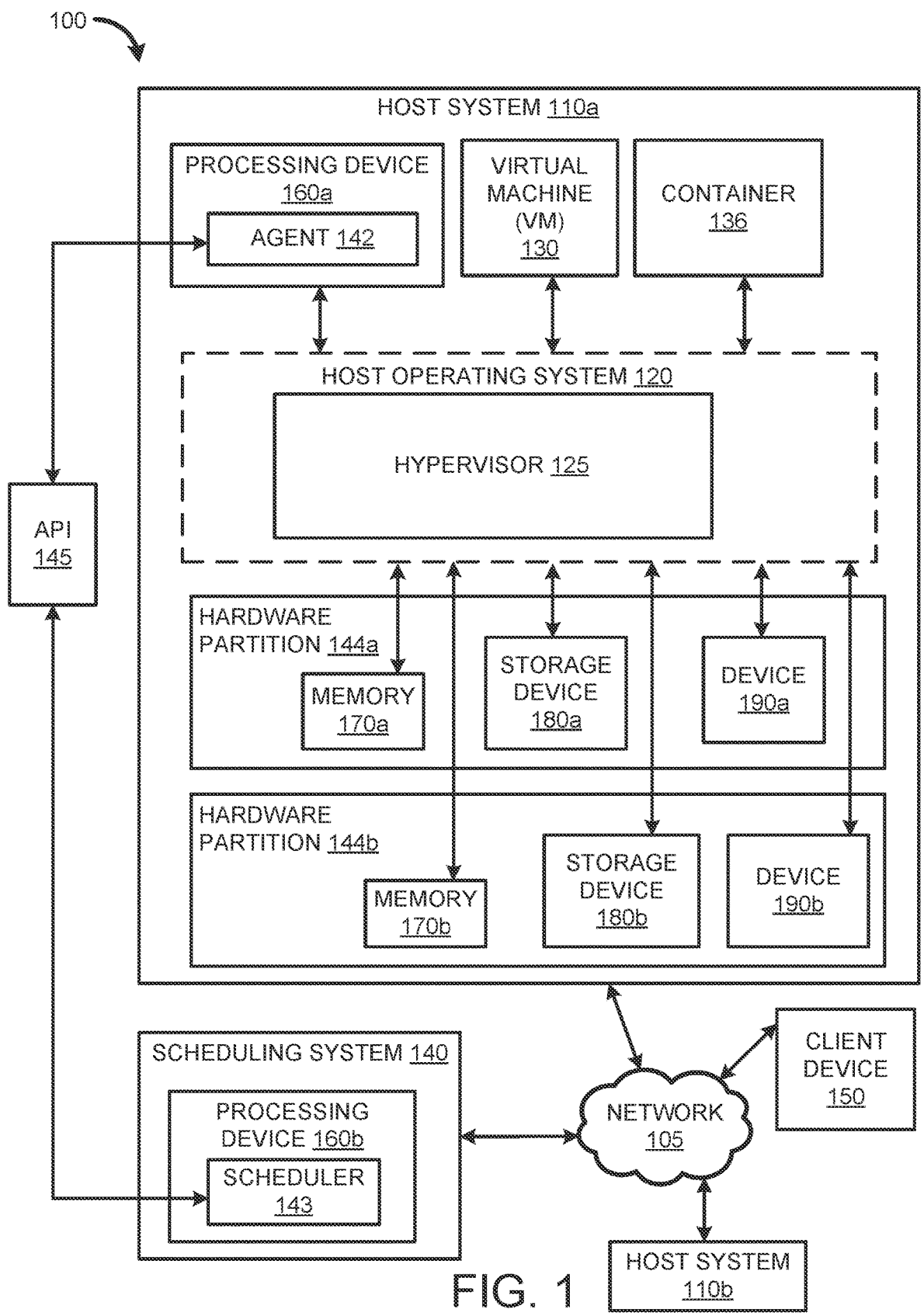
FIG. 1 is a block diagram that illustrates an example container-orchestration architecture, in accordance with some embodiments.

In embodiments, a container-orchestration system may include a host system having multiple hardware partitions, an agent to assign a workload to a hardware partition of the host system, and a scheduler to select at least one of the hardware partitions for running a workload. As used herein, a "resource," a "computer resource" and their variations refer to a physical or virtual component of limited availability within a computer system (e.g., a host system). Examples of resources may include a hardware resource, a software resource, a networking resource, a storage resource, any other type of suitable resource, or any combination of two or more of the preceding types of resources. In embodiments, the hardware partitions may correspond to non-uniform memory access (NUMA) nodes. In some embodiments, the hardware partitions may be sub-NUMA nodes. In an embodiment, the hardware partition may be any other type of defined hardware partition.

In conventional container-orchestration systems, when assigning workloads, the scheduler may have knowledge of the aggregate amount of resources of the host system that are available for the execution of workloads. For example, the scheduler may have knowledge of the total number of central processing unit (CPU) cores, random access memory (RAM), or peripheral component interconnect (PCI) devices across all of the hardware partitions of the host system. The scheduler, however, does not have knowledge of the amount of available resources at a hardware partition granularity. For example, while the scheduler may know the total number of CPU cores of the host system that are available, the scheduler does not know how many CPU cores are available at each of the hardware partitions. Therefore, the scheduler is unable to select particular hardware partitions that have the necessary resources to execute workloads.

Using container-orchestration systems to implement computer architectures, such as a fifth generation (5G) telecommunications (Telco) computer architecture that is based on the 5G technology standard, is becoming more prevalent. With specific regard to the example of a 5G Telco computer architecture, such an architecture is primarily aimed at realizing ultra-high speeds and low latency. As demand for these and other computer architectures increases, pressures to improve the operations (e.g., speeds, latencies, etc.) associated with running workloads in such architectures is also increasing. Delivering a computer architecture that can successfully handle the pressures described above, such as a 5G Telco computer architecture that produces ultra-high speeds and low-latencies, may include at least one latency-sensitive workload in the computer architecture. As used herein, a "latency-sensitive workload" and its variations refer to a workload that is to be run (e.g., executed, etc.) with a low latency, a high throughput, or a combination thereof. Running these and other workloads may necessitate optimizing the scheduler's selection of hardware partitions of a host system for executing these latency-sensitive workloads.

Aspects of the disclosure address the above-noted and other deficiencies by improving scheduling in a container-orchestration system by utilizing hardware topology hints. Upon receiving a workload that is to be executed, the scheduler may query a host system for the available resources of each of the hardware partitions supported by the host system. For example, if a host system includes two NUMA nodes, then the scheduler may query the host system for the available resources at each of the two NUMA nodes. Upon receiving the available resources for the hardware partitions, the scheduler may identify a particular hardware partition to execute the workload in view of the available resources and the amount of resources that are to be used to execute the workload. For example, if the workload uses two CPU cores and a first hardware partition has four available CPU cores, while a second hardware partition has one available CPU core, then the scheduler may select the first hardware partition for executing the workload.

Upon identifying the hardware partition, the scheduler may generate a scheduling hint that is included in one or more containers associated with the workload. The scheduling hint identifies the particular hardware partition that is to be used. When the one or more containers are received by the host system, processing logic of the host system may examine the scheduling hint to determine which of the hardware partitions the one or more containers are to be assigned to for executing the workload. The workload may then be executed by the particular hardware partition.

By enabling the scheduler to receive the available resources at a hardware partition granularity, rather than a host system granularity, the scheduler may be able to intelligently select hardware partitions for executing workloads. By being aware of the amount of available resources at each hardware partition, the scheduler can select the appropriate hardware partition in view of the amount of resources to be used to execute a workload, reducing the latency of the workload and improving the performance of the container-orchestration system.

FIG. 1 is a block diagram that illustrates an example computer system architecture 100, in accordance with some embodiments of the present disclosure. It is to be appreciated that other computer system architectures 100 are possible, and that the implementation of a computer system utilizing examples of some or all of the inventive subject matter set forth herein are not necessarily limited to the specific architecture depicted in FIG. 1. For example, the computer system architecture 100 may be based on or comprise a 5G Telco computer architecture, a cloud computer architecture, any other suitable computer architecture, or any combination of two or more of the preceding computer architectures.

As shown in FIG. 1, the computer system architecture 100 includes host systems 110a, b, scheduling system 140, and client device 150. In embodiments, the scheduling system 140 may be a container-orchestration system. The host systems 110a, b, scheduling system 140, and client device 150 include one or more processing devices 160a, b, memory 170a, b, which may include volatile memory devices (e.g., random access memory (RAM)), non-volatile memory devices (e.g., flash memory) and/or other types of memory devices, storage devices 180a, b (e.g., one or more magnetic hard disk drives, a Peripheral Component Interconnect (PCI) solid state drive, a Redundant Array of Independent Disks (RAID) system, a network attached storage (NAS) array, etc.), and one or more devices 190a, b (e.g., a Peripheral Component Interconnect (PCI) device, network interface controller (NIC), a video card, an input/output (I/O) device, etc.). In at least one embodiment, the devices 190a, b may include one or more processing devices or integrated circuits (ICs), such as one or more central processing units (CPU), one or more graphics processing units (GPU), one or more microprocessors, any other type of processing device or combination of processing devices, or any combination thereof. In certain implementations, memory 170a, b may allow for non-uniform memory access (NUMA), such that memory access time depends on the memory location relative to the processing devices 160a, b and/or the devices 190a, b. One or more other suitable hardware supported partitioning technologies (e.g., sub-NUMA technology, etc.) may be used in lieu of or in combination with the NUMA technology.

It should be noted that the memory 170a, b are collectively memory 170 of the host system 110a and may sometimes be referred to as such in the present disclosure. Furthermore, the storage devices 180a, b are collectively storage device 180 of the host system 110a and may sometimes be referred to as such in the present disclosure. Additionally, the devices 190a, b are collectively device 190 of the host system 110a and may sometimes be referred to as such the present disclosure. Furthermore, use of the phrase "computer resources of the host system 110a" and its variations in the present disclosure is intended to refer to one or more resources of the host system 110a regardless of whether such resources are illustrated in FIG. 1. Examples of the resources of the host system 110a include, but are not limited to, the memory 170, the storage device 180, the device 190, or a combination thereof.

It should also be noted that although, for simplicity, a single processing device 160a, b, memory 170, storage device 180, and device 190 are depicted in FIG. 1, other embodiments of host systems 110a, b, scheduling system 140, and/or client device 150 may include a plurality of processing devices, memory, storage devices, and devices. Each of the host systems 110a, b and scheduling system 140 may be a server, a mainframe, a workstation, a personal computer (PC), a mobile phone, a palm-sized computing device, etc. In embodiments, the host systems 110a, b, scheduling system 140, and client device 150 may be separate computing devices. In some embodiments, host systems 110a, b, scheduling system 140, and/or client device 150 may be implemented by a single computing device. For clarity, some components of the scheduling system 140, host system 110b, and client device 150 are not shown. Furthermore, although the computer system architecture 100 is illustrated as having two host systems, embodiments of the disclosure may utilize any number of host systems.

The host system 110a, b may additionally include a virtual machine (VM) 130, a container 136, and/or a host operating system (OS) 120. The VM 130 is a software implementation of a machine that executes programs as though it was an actual physical machine. The container 136 acts as isolated execution environments for different functions of applications. The host OS 120 manages the hardware resources of the computer system and provides functions such as inter-process communication, scheduling, memory management, and so forth.

The host OS 120 may include a hypervisor 125 (which may also be known as a virtual machine monitor (VMM)), which provides a virtual operating platform for the VMs 130 and manages their execution. It is to be appreciated that more than one hypervisor can exist in the architecture 100. The hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. The hypervisor 125 may present other software (e.g., "guest" software) with an abstraction of one or more VMs that provide the same or different abstractions to various guest software (e.g., guest operating system, guest applications, etc.). In some alternative implementations, the hypervisor 125 may be external to host OS 120, rather than embedded within host OS 120, or may replace host OS 120.

Host system 110a further includes hardware partitions 144a, b. Hardware partition 144a and hardware partition 144b may each have corresponding resources (e.g., memory 170a, b, storage devices 180a, b, and devices 190a, b) that may be available for the execution of workloads received by the host system. In some embodiments, hardware partitions 144a, b may be NUMA nodes. In embodiments, hardware partitions 144a, b may be sub-NUMA nodes. In an embodiment, hardware partitions 144a, b may be any type of vendor defined hardware partition.

In at least one embodiment, the host systems 110a, b, scheduling system 140, and client device 150 are coupled to each other (e.g., may be operatively coupled, communicatively coupled, may communicate data/messages with each other) via network 105. The network 105 may be a public network (e.g., the internet), a private network (e.g., a local area network (LAN) or wide area network (WAN)), any other network, or a combination thereof. In one embodiment, the network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110a, b, scheduling system 140, and/or client device 150.

As shown in FIG. 1, one or more embodiments of the host system 110a may include an agent 142. The processing device 160a may implement (e.g., execute, etc.) the agent 142. It is to be appreciated that one or more of the host systems 110a, b can have one or more agents 142 therein. The agent 142 may receive one or more containers associated with a workload that is to be executed by the host system 110a. The one or more containers may include a scheduling hint previously added to the one or more containers by scheduler 143. The agent 142 may assign the one or more containers to a hardware partition (e.g., hardware partition 144a or hardware partition 144b) indicated by the scheduling hint for execution.

In some embodiments, the processing device 160b may implement (e.g., execute, etc.) the scheduler 143. The scheduler 143 may control the selection of resources and hardware partitions of the host systems 110a, b to run (e.g., execute, etc.) one or more workloads associated with the architecture 100. The scheduler 143 may be tasked with processing (e.g., receiving, assigning, etc.) one or more workloads associated with the architecture 100. Upon receiving a workload, the scheduler 143 may query host systems 110a, b for the resources available in each hardware partition (e.g., hardware partition 144a and hardware partition 144b) to execute the workload. In embodiments, the scheduler 143 may receive the available resources of hardware partition 144a and hardware partition 144b via an application programming interface (API) 145. In some embodiments, the agent 142 may provide the available resources to the scheduler 143. In embodiments, other processing logic of processing device 160a may provide the available resources to the scheduler 143. Upon receiving the available resources, the scheduler 143 may identify a particular hardware partition for executing the workload and generate a scheduling hint identifying the particular hardware partition, as previously described. Additional details regarding the agent 142 and the scheduler 143 are described at FIGS. 2-11 below.

Figure 2:
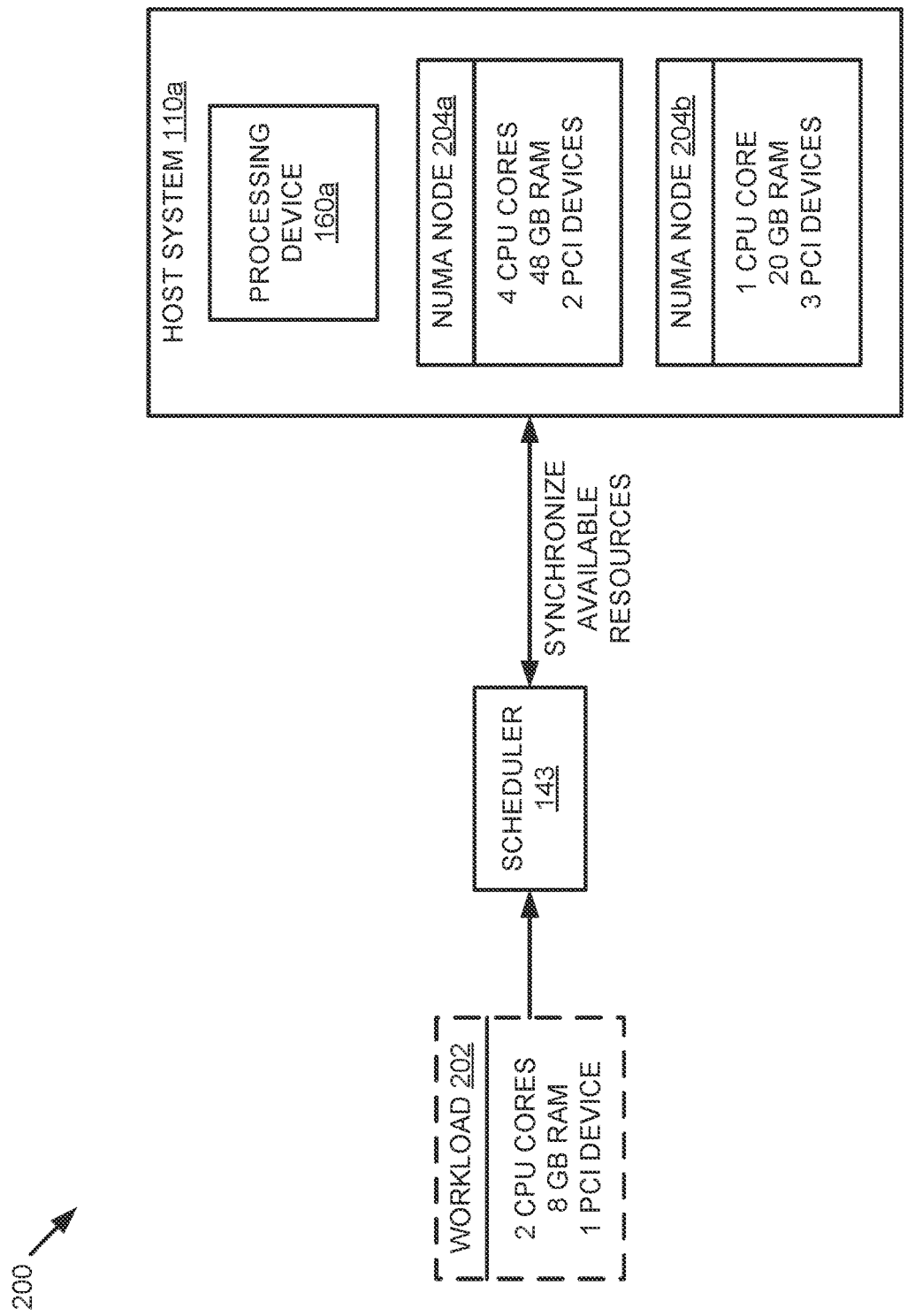
FIG. 2 is an illustration of an example of a scheduler of a computer architecture synchronizing available resources of a host system, in accordance with embodiments of the disclosure.

FIG. 2 is an illustration of an example of a scheduler of a computer architecture 200 synchronizing available resources of a host system, in accordance with embodiments of the disclosure. The computer architecture 100 includes a scheduler 143 and a host system 110a including a processing device 160a, as previously described at FIG. 1. The host system 110a includes NUMA node 204a and NUMA node 204b, which may correspond to hardware partition 144a and hardware partition 144b in some embodiments. Although FIGS. 2-6 describe a single host system including NUMA node 204a and NUMA node 204b, such descriptions are for illustrative purposes only. Embodiments of the disclosure may utilize any utilize any number of host systems, any type of hardware partition, any number of hardware partitions on the host system(s), or any combination thereof.

Referring to FIG. 2, NUMA node 204a and NUMA node 204b each include different amounts of resources that are available for execution of workloads. NUMA node 204a has four CPU cores, 48 gigabytes (GB) of RAM, and two PCI devices that are available for execution of workloads and NUMA node 204b has one CPU core, 20 GB of RAM, and three PCI devices that are available for execution of workloads.

The scheduler 143 may receive a workload 202 to be executed by host system 110a. The workload 202 may correspond to one or more operations to be performed by the host system 110a. It should be noted that workload 202 is shown for illustrative purposes only and is not a physical component of computer architecture 200. In some embodiments, the workload 202 may be received from a client device, such as client device 150 of FIG. 1. The workload 202 includes an amount of resources that are to be used to execute workload 202. For example, workload 202 will use two CPU cores, 8 GB of RAM, and one PCI device.

Upon receiving the workload 202, the scheduler 143 may synchronize the available resources of NUMA node 204a and NUMA node 204 with host system 110a. The scheduler 143 may synchronize the available resources by transmitting a query for available resources to host system 110a. Processing logic of processing device 160a of the host system 110a may then provide the scheduler 143 with the available resources at NUMA node 204a and NUMA node 204b. For example, upon receiving the query, processing logic of host system 110a may provide a response to scheduler 143 that indicates that NUMA node 204a has four CPU cores, 48 gigabytes (GB) of RAM, and two PCI devices that are available for execution of workloads and NUMA node 204b has one CPU core, 20 GB of RAM, and three PCI devices that are available for execution of workloads.

Figure 3:
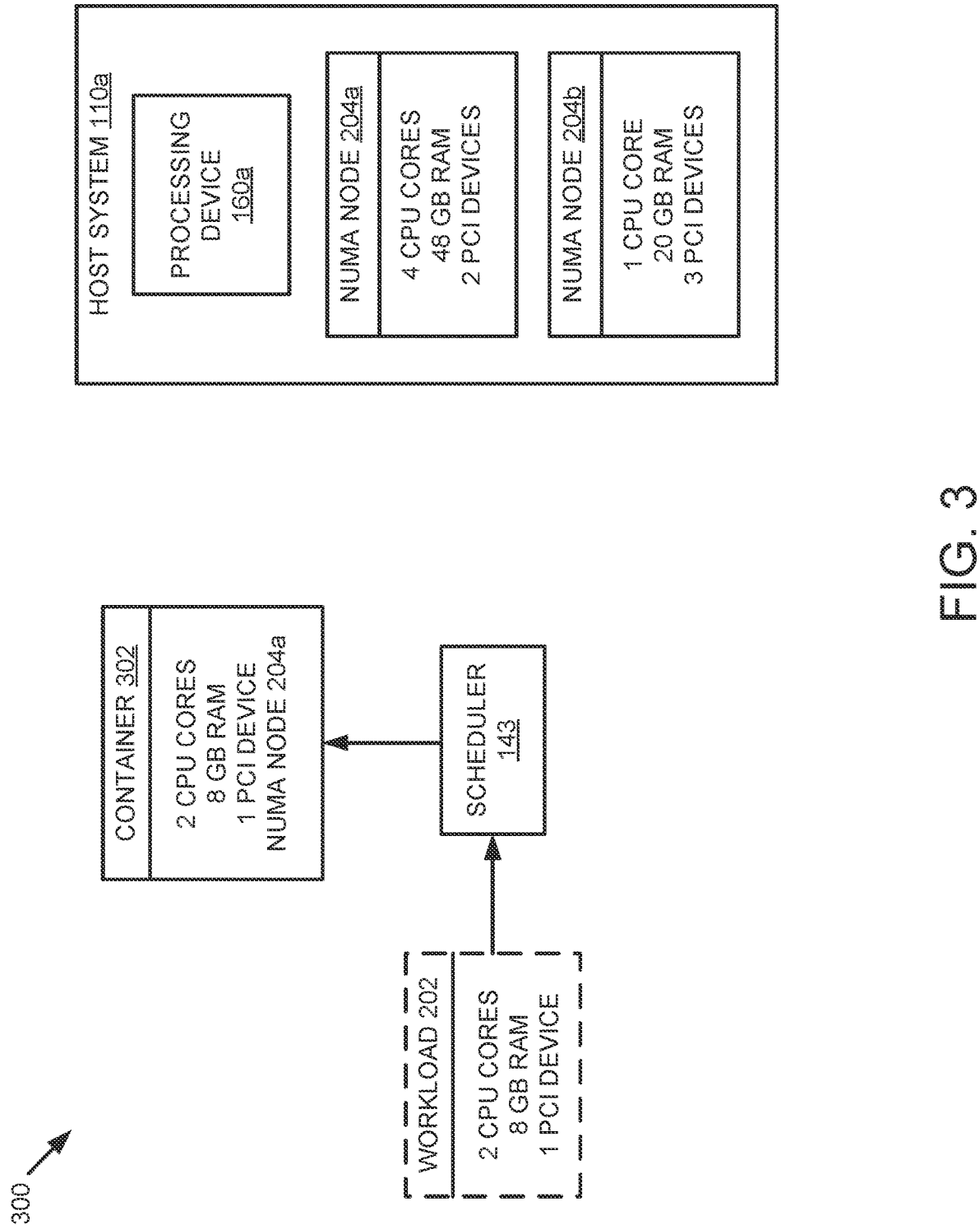
FIG. 3 is an illustration of an example of a scheduler of a computer architecture generating a container including a scheduling hint, in accordance with embodiments of the disclosure.

FIG. 3 is an illustration of an example of a scheduler of a computer architecture 300 generating a container including a scheduling hint, in accordance with embodiments of the disclosure. In FIG. 3, the scheduler 143 has synchronized the available resources at NUMA node 204a and NUMA node 204b, as previously described at FIG. 2. Upon receiving the available resources, the scheduler 143 may compare the available resources at NUMA node 204a and NUMA node 204b to the amount of resources that are to be used to execute workload 202.

Referring to FIG. 3, NUMA node 204a has four CPU cores, 48 GB of RAM, and two PCI devices that are available for execution of workloads and NUMA node 204b has one CPU core, 20 GB of RAM, and three PCI devices that are available for execution of workloads. Workload 202 is to use two CPU cores, 8 GB of RAM, and one PCI device. Upon comparing the available resources at NUMA node 204a and NUMA node 204b to the amount of resources to execute workload 202, the scheduler 143 may determine that NUMA node 204b has insufficient available resources to execute workload 202 because NUMA node 204b has one available CPU core, while workload 202 uses two CPU cores. Meanwhile, NUMA node 204a has sufficient resources (e.g., CPU cores, RAM, and PCI devices) available to execute workload 202. Upon making the comparison, the scheduler 143 may select NUMA node 204a for executing workload 202.

The scheduler 143 may generate a container 302 that is associated with workload 202 and may be used to execute workload 202. Although a single container is shown, in embodiments, multiple containers may be used. The container 302 may include the amount of resources to be used to execute workload 202 as well as the scheduling hint that indicates that NUMA node 204a is to be used to execute workload 202.

Figure 4:
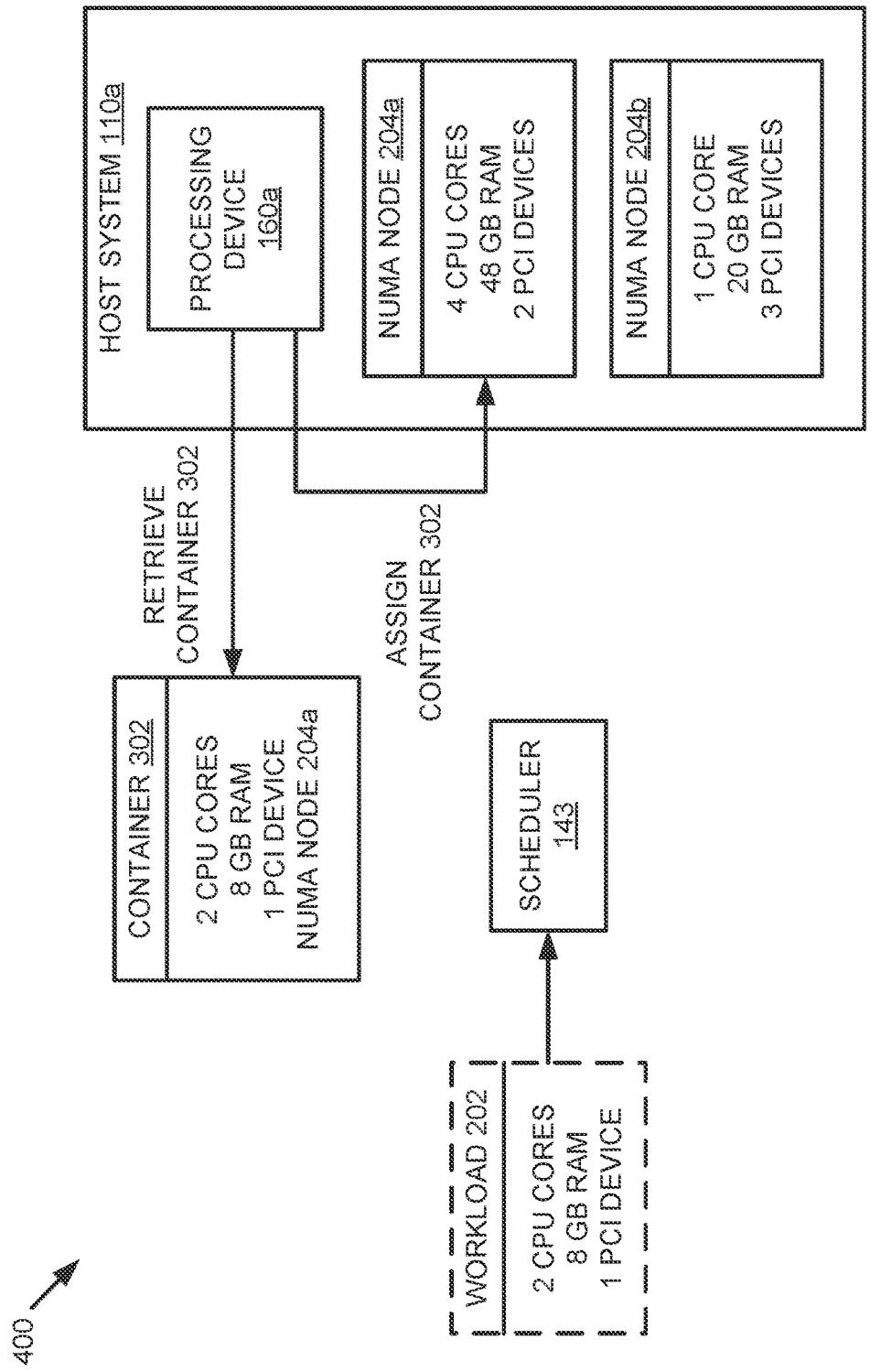
FIG. 4 is an illustration of an example of a host system of a computing architecture assigning a container to a hardware partition in view of a scheduling hint, in accordance with embodiments of the disclosure.

FIG. 4 is an illustration of an example of a host system of a computing architecture 400 assigning a container to a hardware partition in view of a scheduling hint, in accordance with embodiments of the disclosure. In FIG. 4, processing logic of processing device 160a retrieves container 302 that includes the amount of resources to execute workload 202 and the scheduling hint indicating that NUMA node 204a is to be used to execute workload 202.

Upon retrieving the container 302, the processing logic may identify the scheduling hint included in container 302 to determine which NUMA node the container 302 is to be assigned to. For example, the processing logic may identify that the scheduling hint included in container 302 indicates that NUMA node 204a is to be used to execute workload 202. Upon identifying the scheduling hint, the processing logic may assign container 302 to the NUMA node indicated by the scheduling hint, where the NUMA node is to execute the workload 202. For example, the processing logic may assign container 302 to NUMA node 204a, which is the NUMA node indicated by the scheduling hint.

Upon assignment of container 302, the resources of NUMA node 204a may be used to execute the workload 202 within container 302. For example, two CPU cores, 8 GB of RAM, and one PCI device of NUMA node 204a may be used to execute workload 202. In some embodiments, upon executing workload 202, the results of the execution may be provided to a client device (not shown) that transmitted a request to the scheduler 143 to execute the workload 202. Once the workload 202 has been executed, the resources of NUMA node 204a that were consumed by workload 202 may be made available for the execution of other workloads received by the scheduler 143.

Figure 5:
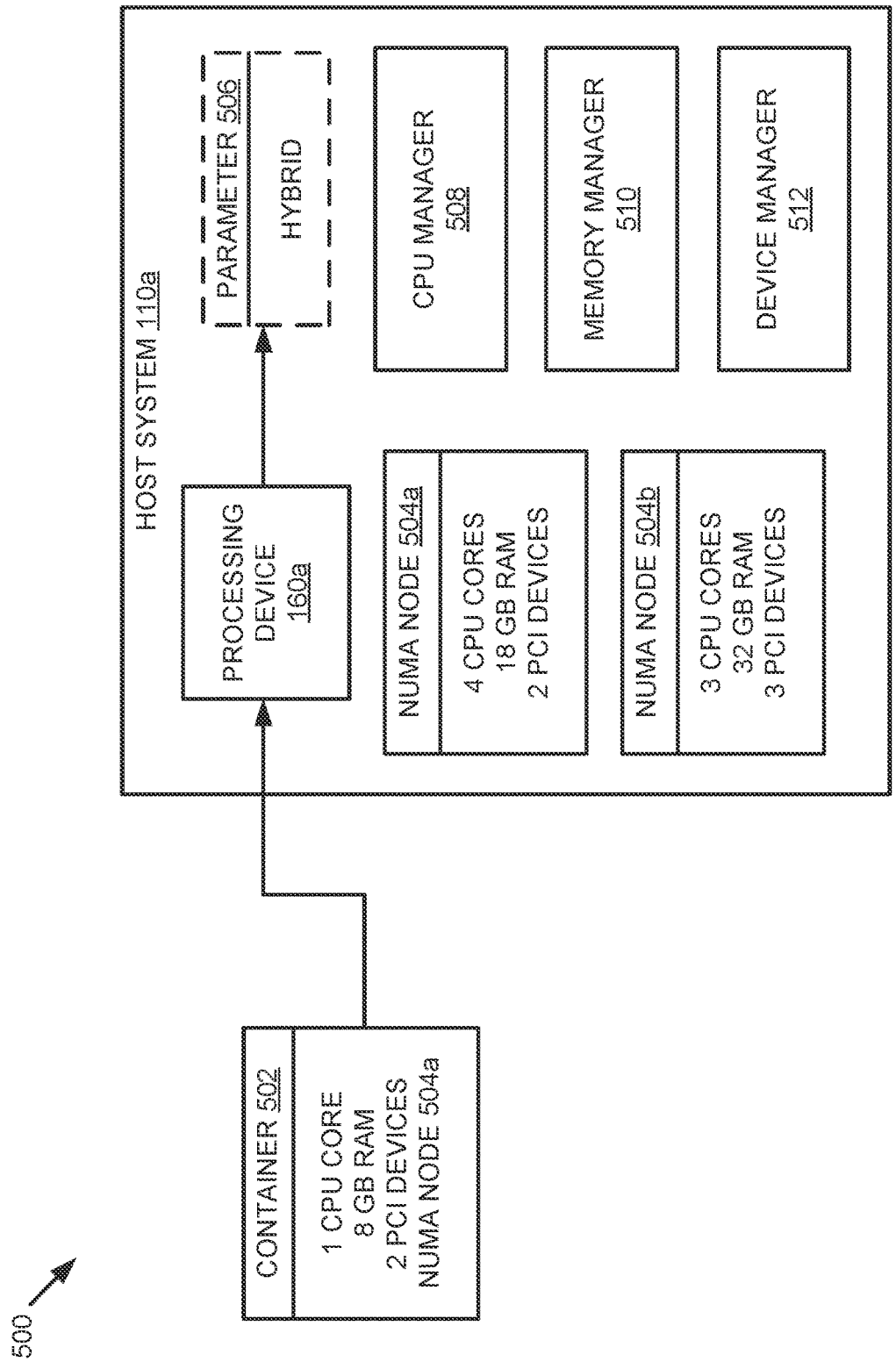
FIG. 5 is an illustration of an example of a host system of a computing architecture identifying a parameter associated with the use of a scheduling hint, in accordance with embodiments of the disclosure.

FIG. 5 is an illustration of an example of a host system of a computing architecture 500 identifying a parameter associated with the use of a scheduling hint, in accordance with embodiments of the disclosure. The computing architecture 500 includes host system 110a that includes a processing device 160a, as previously described at FIG. 1. Container 502 may correspond to a container associated with a workload (not shown) that includes a scheduling hint indicating that NUMA node 504a is to be used to execute the workload. The host system 110a may include a CPU manager 508, a memory manager 510, and a device manager 512, that may monitor the CPU cores, memory, and PCI devices, respectively, of the host system 110a.

In some embodiments, the host system 110a may include a parameter 506 that is associated with the use of a scheduling hint when assigning a container 502 to a particular NUMA node. In some scenarios, a system administrator may not want the host system 110a to use the scheduling hint when assigning container 502, or may want the scheduling hint to be used in addition to other information received from other resource managers (e.g., CPU manager 508, memory manager 510, device manager 512) when selecting a NUMA node. To facilitate this, a system administrator may provide the host system 110a with a parameter 506 that indicates whether or not the scheduling hint is to be used and, if so, how the scheduling hint is to be used.

In some embodiments, the parameter 506 may indicate that the use of scheduling hints is enabled, meaning that the scheduling hint will be used designate which NUMA node the container 502 will be assigned to. In embodiments, the parameter 506 may indicate that the use of scheduling hints is disabled, meaning that the scheduling hint will not be used to determine which NUMA node container 502 will be assigned to. In an embodiment, the parameter 506 may indicate a hybrid use of the scheduling hint, meaning that the scheduling hint will be used in addition to other information from the other resource managers of host system 110a to determine which NUMA node container 502 will be assigned to.

Referring to FIG. 5, upon retrieving container 502, processing logic of processing device 160a may identify parameter 506 that indicates how the scheduling hint included in container 502 is to be used. In FIG. 5, the parameter 506 indicates a hybrid use of the scheduling hint. When determining which NUMA node to assign container 502 to, the processing device 160a may use both the scheduling hint and information from the other resource managers, as will be described in further detail below.

Figure 6:
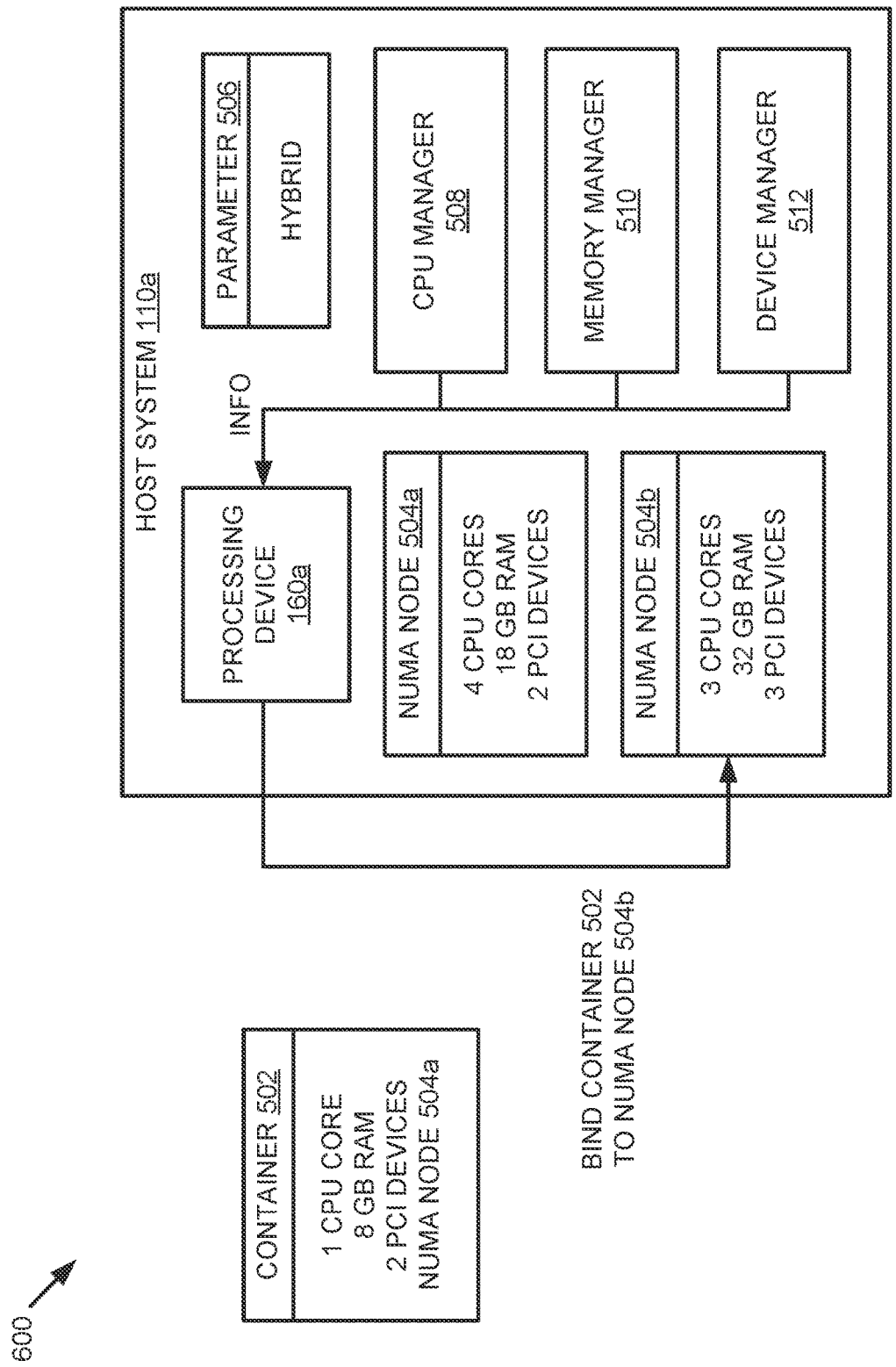
FIG. 6 is an illustration of an example of a host system of a computing architecture implementing a hybrid use of a scheduling hint, in accordance with embodiments of the disclosure.

FIG. 6 is an illustration of an example of a host system of a computing architecture 600 implementing a hybrid use of a scheduling hint, in accordance with embodiments of the disclosure. Upon determining that the parameter 506 indicates a hybrid use of the scheduling hint, the processing device 160a may receive information from the CPU manager 508, the memory manager 510, and the device manager 512. For example, the processing device 160a may receive information associated with the CPU cores of NUMA node 504a and NUMA node 504b from CPU manager 508, information associated with the memory of NUMA node 504a and NUMA node 504b from memory manager 510, and information associated with the PCI devices of NUMA node 504a and NUMA node 504b from device manager 512. In some embodiments, host system 110a may include other types of resource managers. Upon receiving the information from the resource managers, processing logic of processing device 160a may determine NUMA node to assign (e.g., bind) the container 502 to using both the scheduling hint and the information received from the resource managers.

Referring to FIG. 6, the scheduling hint included in container 502 indicates that NUMA node 504a is to be used to execute the workload. The information from device manager 512 may indicate the number of PCI devices available at NUMA node 504a is two and the number of PCI devices available at NUMA node 504b is three. Because the workload of container 502 uses two PCI devices, if the container 502 is bound to NUMA node 504a, then NUMA node 504a would not have any remaining PCI devices to be used by other workloads. Meanwhile, NUMA node 504b has three available PCI devices, so if the container 502 is bound to NUMA node 504b, one PCI device is still available to be used by other workloads. Furthermore, there are sufficient CPU cores and memory at NUMA node 504b to execute the workload associated with container 502, while still leaving CPU cores and memory available at NUMA node 504b for executing other workloads. Therefore, processing device 160a may determine that container 502 is to be bound to NUMA node 504b in view of the information received from CPU manager 508, memory manager 510, and device manager 512, despite the scheduling hint indicating that NUMA node 504a is to be used to execute the workload.

It should be noted that the hybrid process described above is shown for illustrative purposes only. Embodiments of the disclosure may utilize the scheduling hint and information received from resource managers of host system 110a in a variety of ways when determining which NUMA node (or hardware partition) a container associated with a workload is to be assigned to.

Figure 7:
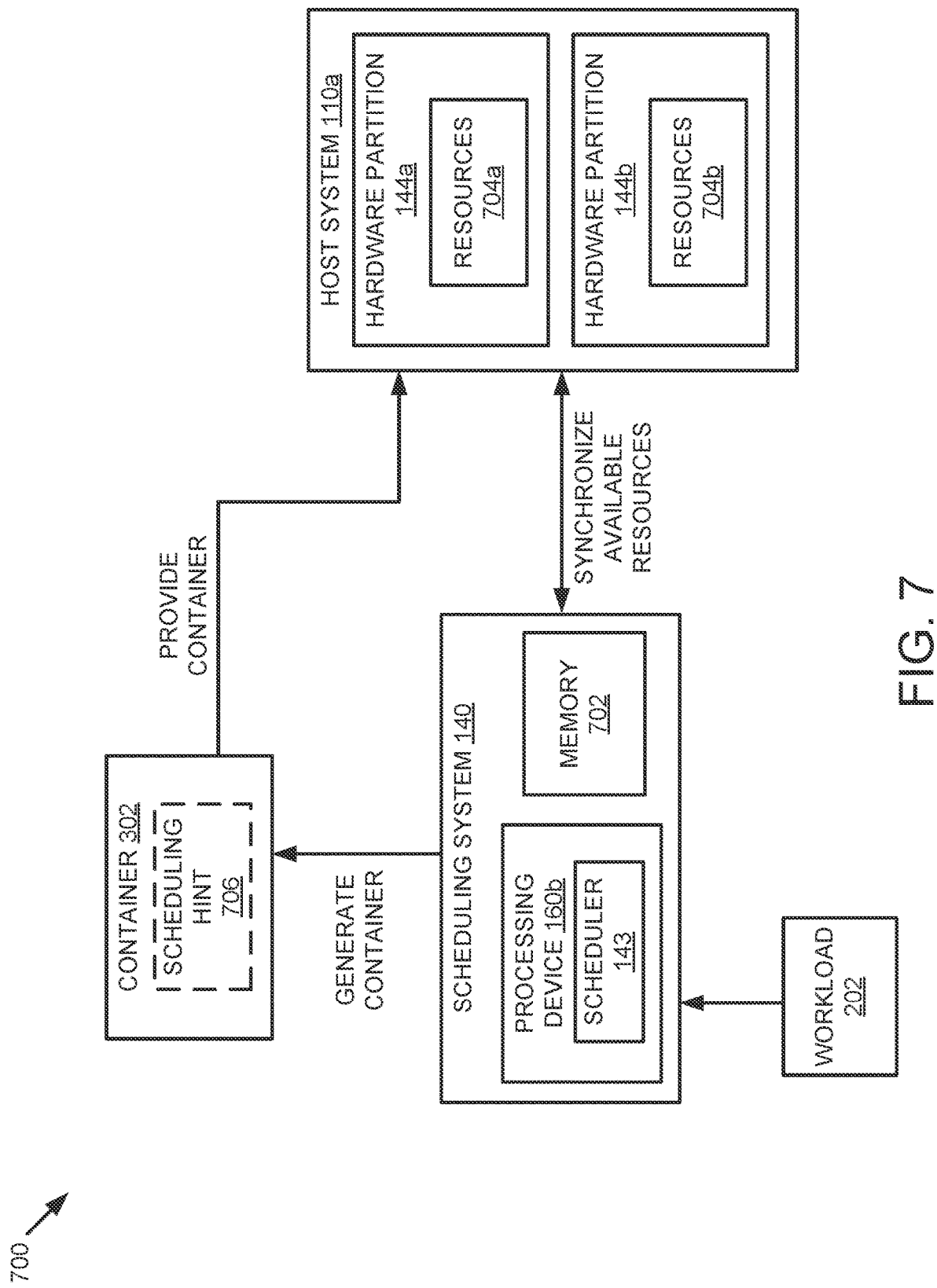
FIG. 7 is a component diagram of an example of a computing architecture, in accordance with embodiments of the disclosure.

FIG. 7 is a component diagram of an example of a computing architecture 700, in accordance with embodiments of the disclosure. The computing architecture 700 includes host systems 110a, scheduling system 140, processing device 160b, scheduler 143, hardware partition 144a, and hardware partition 144b of FIG. 1. The computing architecture 700 further includes workload 202 of FIG. 2 and container 302 of FIG. 3.

Scheduling system 140 includes a memory 702 that is operatively coupled to processing device 160b. In embodiments, memory 702 may include volatile memory devices (e.g., random access memory (RAM)), non-volatile memory devices (e.g., flash memory) and/or other types of memory devices.

Hardware partition 144a and hardware partition 144b may include resources 704a and 704b, respectively. Resources 704a and resources 704b may be a physical or virtual component of limited availability within a computer system (e.g., a host system). Examples of resources may include a hardware resource, a software resource, a networking resource, a storage resource, any other type of suitable resource, or any combination of two or more of the preceding types of resources. In some embodiments, resources 704a and resources 704b may correspond to one or more of CPU cores, memory, or PCI devices.

As previously described, when workload 202 is received by scheduling system 140, the scheduler 143 may synchronize the available resources (e.g., resources 704a and resources 704b) of hardware partition 144a and hardware partition 144b. Upon synchronizing the resources, the scheduler 143 may generate a container 302 that includes a scheduling hint 706 that indicates which hardware partition of host system 110a is to execute workload 202. The container 302 including the scheduling hint 706 is then provided to host system 110a.

Figure 8:
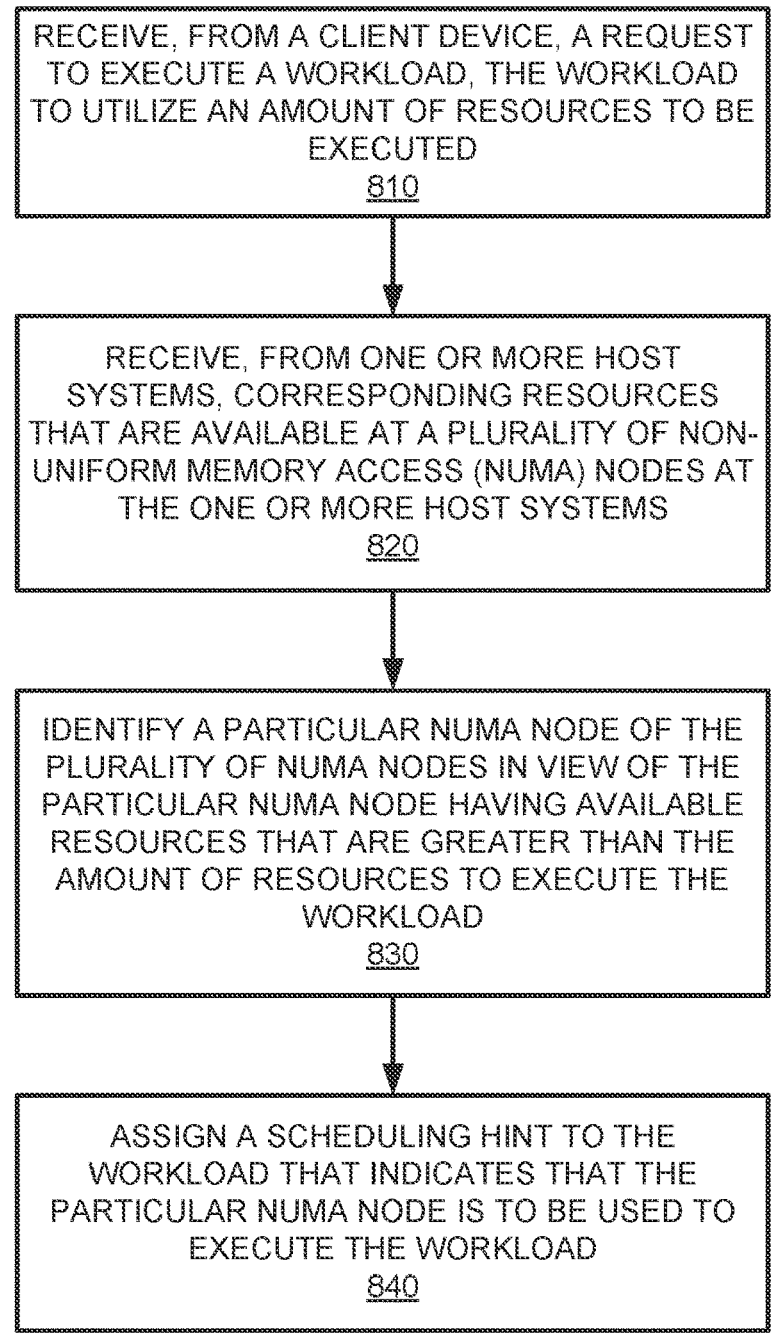
FIG. 8 is a flow diagram of a method of assigning a scheduling hint to a workload, in accordance with some embodiments.

FIG. 8 is a flow diagram of a method 800 of assigning a scheduling hint to a workload, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by scheduler 143 of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic receives, from a client device, a request to execute a workload, where the workload is to utilize an amount of resources to be executed.

At block 820, the processing logic receives, from one or more host systems, corresponding resources that available at a plurality of non-uniform memory access (NUMA) nodes at the one or more host systems.

At block 830, the processing logic identifies a particular NUMA node of the plurality of NUMA nodes in view of the particular NUMA node having available resources that are greater than the amount of resources to execute the workload.

At block 840, the processing logic assigns a scheduling hint to the workload that indicates that the particular NUMA node is to be used to execute the workload.

Figure 9:
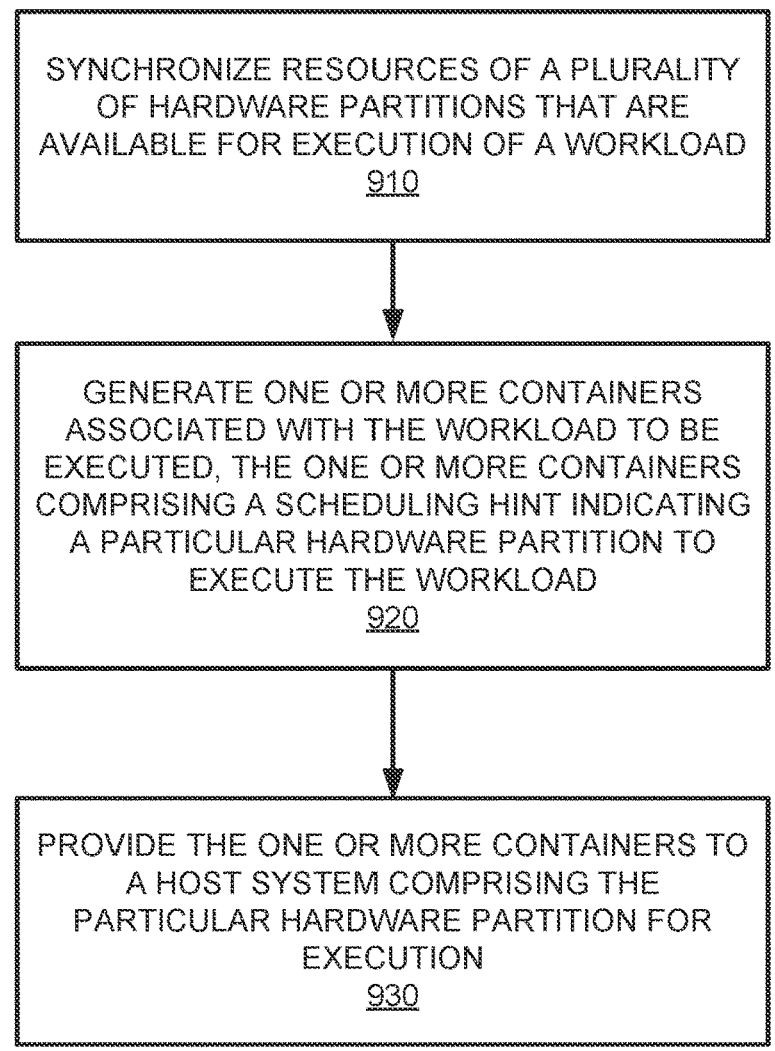
FIG. 9 is a flow diagram of a method of generating one or more containers including a scheduling hint in view of available resources of hardware partitions, in accordance with some embodiments.

FIG. 9 is a flow diagram of a method 900 of generating one or more containers including a scheduling hint in view of available resources of hardware partitions, in accordance with some embodiments. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 900 may be performed by scheduler 143 of FIG. 1.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic synchronizes resources of a plurality of hardware partitions that are available for execution of a workload.

At block 920, the processing logic generates one or more containers associated with the workload to be executed. The one or more containers includes a scheduling hint that indicates a particular hardware partition to execute the workload.

At block 930, the processing logic provides the one or more containers to a host system including the particular hardware partition for execution.

FIG. 10 is a flow diagram of a method 1000 of a host system assigning containers associated with a workload to a NUMA node in view of a scheduling hint, in accordance with some embodiments. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1000 may be performed by processing device 160a of FIG. 1.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

Method 1000 begins at block 1010, where the processing logic receives, from a scheduling system, one or more containers associated with a workload to be executed by a host system. The host system includes a plurality of NUMA nodes and the one or more containers include a scheduling hint indicating a NUMA node of the plurality of NUMA nodes that is to execute the workload.

At block 1020, the processing logic assigns the one or more containers to the NUMA node in view of the scheduling hint.

FIG. 11 is a flow diagram of a method 1100 of a host system binding a workload to a hardware partition in view of a scheduling hint, in accordance with some embodiments. Method 1100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1100 may be performed by processing device 160a of FIG. 1.

With reference to FIG. 11, method 1100 illustrates example functions used by various embodiments. Although specific function blocks ("blocks") are disclosed in method 1100, such blocks are examples. That is, embodiments are well suited to performing various other blocks or variations of the blocks recited in method 1100. It is appreciated that the blocks in method 1100 may be performed in an order different than presented, and that not all of the blocks in method 1100 may be performed.

Method 1100 begins at block 1110, where the processing logic receives, from a scheduling system, a workload to be executed by a host system. The host system includes a plurality of hardware partitions and the workload includes a scheduling hint indicating a hardware partition of the plurality of hardware partitions that is to execute the workload.

At block 1120, the processing logic binds the workload to the hardware partition in view of the scheduling hint.

Figure 12:
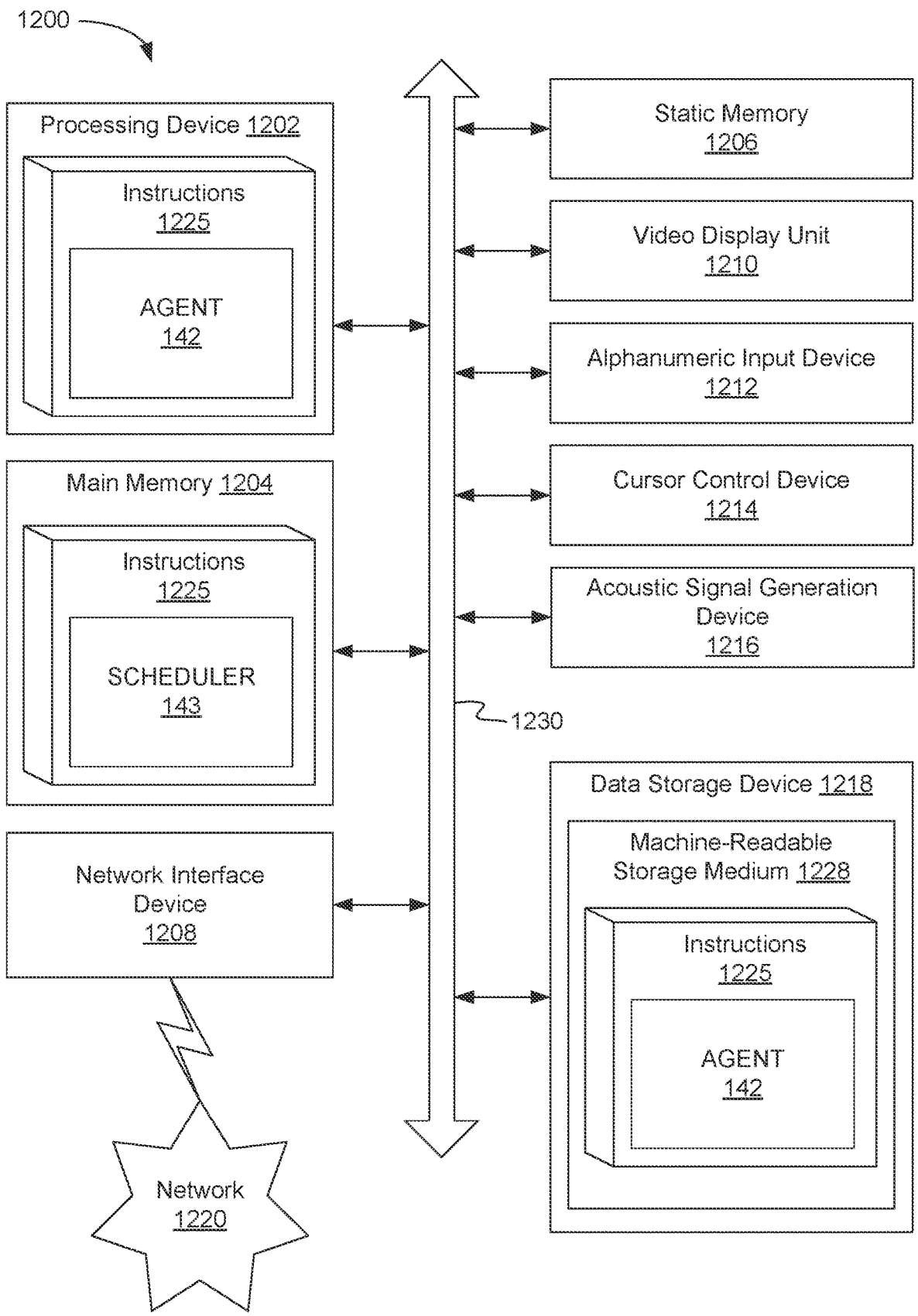
FIG. 12 is a block diagram of an example apparatus that may perform one or more of the operations described herein, in accordance with some embodiments of the present disclosure.

FIG. 12 is a block diagram of an example computing device 1200 that may perform one or more of the operations described herein, in accordance with some embodiments. Computing device 1200 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1200 may include a processing device (e.g., a general purpose processor, a PLD, etc.) 1202, a main memory 1204 (e.g., synchronous dynamic random access memory (DRAM), read-only memory (ROM)), a static memory 1206 (e.g., flash memory and a data storage device 1218), which may communicate with each other via a bus 1230.

Processing device 1202 may be provided by one or more general-purpose processing devices such as a microprocessor, central processing unit, or the like. In an illustrative example, processing device 1202 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1202 may also comprise one or more special-purpose processing devices such as an application specific integrated circuit (ASIC), a field programmable gate array (FPGA), a digital signal processor (DSP), network processor, or the like. The processing device 1202 may be configured to execute the operations described herein, in accordance with one or more aspects of the present disclosure, for performing the operations and steps discussed herein.

Computing device 1200 may further include a network interface device 1208 which may communicate with a network 1220. The computing device 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and an acoustic signal generation device 1216 (e.g., a speaker). In one embodiment, video display unit 1210, alphanumeric input device 1212, and cursor control device 1214 may be combined into a single component or device (e.g., an LCD touch screen).

Data storage device 1218 may include a computer-readable storage medium 1228 on which may be stored one or more sets of instructions 1225 that may include instructions for an agent, e.g., agent 142 or a scheduler, e.g., scheduler 143 for carrying out the operations described herein, in accordance with one or more aspects of the present disclosure. Instructions 1225 may also reside, completely or at least partially, within main memory 1204 and/or within processing device 1202 during execution thereof by computing device 1200, main memory 1204 and processing device 1202 also constituting computer-readable media. The instructions 1225 may further be transmitted or received over a network 1220 via network interface device 1208.

While computer-readable storage medium 1228 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: receiving, from a client device, a request to execute a workload, the workload to utilize an amount of resources to be executed; receiving, from one or more host systems, corresponding resources that are available at a plurality of non-uniform memory access (NUMA) nodes at the one or more host systems; identifying, by a processing device, a particular NUMA node of the plurality of NUMA nodes in view of the particular NUMA node having available resources that are greater than the amount of resources to execute the workload; and assigning a scheduling hint to the workload that indicates that the particular NUMA node is to be used to execute the workload.

Example 2 is the method of Example 1, further comprising: generating one or more containers associated with the workload, wherein the one or more containers comprise the amount of resources associated with the workload and the scheduling hint.

Example 3 is the method of any of Examples 1-2, further comprising: providing the one or more containers to a host system of the one or more host systems comprising the particular NUMA node to execute the workload.

Example 4 is the method of any of Examples 1-3, wherein the scheduling hint causes the host system to assign the one or more containers to the particular NUMA node to execute the workload.

Example 5 is the method of any of Examples 1-4, wherein each of the one or more host systems comprises two or more NUMA nodes.

Example 6 is the method of any of Examples 1-5, wherein the corresponding resources are received from the one or more host systems via an application programming interface (API).

Example 7 is the method of any of Examples 1-6, wherein the one or more host systems comprise a cloud computing environment.

Example 8 is the method of any of Examples 1-7, wherein the resources comprise one or more of central processing unit (CPU) cores, random access memory (RAM), or peripheral component interconnect (PCI) devices.

Example 9 is a system comprising: a memory; and a processing device, operatively coupled to the memory, to: synchronize resources of a plurality of hardware partitions that are available for execution of a workload; generate one or more containers associated with the workload to be executed, the one or more containers comprising a scheduling hint indicating a particular hardware partition to execute the workload; and provide the one or more containers to a host system comprising the particular hardware partition for execution.

Example 10 is the system of Example 9, wherein the hardware partition comprises a non-uniform memory access (NUMA) node.

Example 11 is the system of any of Examples 9-10, wherein the hardware partition comprises a sub non-uniform memory access (NUMA) node.

Example 12 is the system of any of Examples 9-11, wherein to generate the one or more containers associated with the workload, the processing device is further to: identify the particular hardware partition to execute the workload in view of the resources of the particular hardware partition that are available to execute the workload.

Example 13 is the system of any of Examples 9-12, wherein the processing device is further to: receive, from a client device, a request to execute the workload, wherein the resources of the plurality of hardware partitions are synchronized in response to receiving the request.

Example 14 is the system of any of Examples 9-13, wherein the host system comprises two or more hardware partitions.

Example 15 is the system of any of Examples 9-14, wherein synchronizing the resources of the plurality of hardware partitions provides corresponding resources available for execution of the workload at each of the two or more hardware partitions.

Example 16 is the system of any of Examples 9-15, wherein the scheduling hint causes the host system to assign the one or more containers to the particular hardware partition.

Example 17 is a non-transitory computer-readable storage medium including instructions that, when executed by a processing device of a host system, cause the processing device to: receive, from a scheduling system, one or more containers associated with a workload to be executed by the host system, the host system comprising a plurality of non-uniform memory access (NUMA) nodes and the one or more containers comprising a scheduling hint indicating a NUMA node of the plurality of NUMA nodes that is to execute the workload; and assign, by the processing device, the one or more containers to the NUMA node in view of the scheduling hint.

Example 18 is the non-transitory computer-readable storage medium of Example 17, wherein the processing device is further to: provide, to the scheduling system, corresponding resources that are available to execute the workload for each of the plurality of NUMA nodes, wherein the one or more containers associated with the workload are received in response to providing the corresponding resources.

Example 19 is the non-transitory computer-readable storage medium of any of Examples 17-18, wherein the corresponding resources are provided to the scheduling system via an application programming interface (API).

Example 20 is the non-transitory computer-readable storage medium of any of Examples 17-19, wherein to assign the one or more containers to the NUMA node in view of the scheduling hint, the processing device is further to: identify a parameter associated with use of the scheduling hint for assigning the one or more containers; determine whether the parameter indicates that the scheduling hint is to be used for assigning the one or more containers; and in response to determining that the parameter indicates that the scheduling hint is to be used, assign the one or more containers to the NUMA node in view of the scheduling hint.

Example 21 is the non-transitory computer-readable storage medium of any of Examples 17-20, wherein the parameter corresponds to one of the use of the scheduling hint being enabled, the use of the scheduling hint being disabled, or a hybrid use of the scheduling hint.

Example 22 is the non-transitory computer-readable storage medium of any of Examples 17-21, wherein the parameter corresponds to the hybrid use of the scheduling hint and wherein the processing device is further to: determine whether to assign the one or more containers to the NUMA node in view of the scheduling hint and information received from other resource managers of the host system.

Example 23 is a method comprising: receiving, from a scheduling system, a workload to be executed by a host system, the host system comprising a plurality of hardware partitions and the workload comprising a scheduling hint indicating a hardware partition of the plurality of hardware partitions that is to execute the workload; and binding, by a processing device of the host system, the workload to the hardware partition in view of the scheduling hint.

Example 24 is the method of Example 23, further comprising: providing, to the scheduling system, corresponding resources that are available to execute the workload for each of the plurality of hardware partitions, wherein the workload is received in response to providing the corresponding resources.

Example 25 is the method of any of Examples 23-24, wherein the corresponding resources are provided to the scheduling system via an application programming interface (API).

Example 26 is the method of any of Examples 23-25, wherein binding the workload to the hardware partition in view of the scheduling hint further comprises: identifying a parameter associated with use of the scheduling hint for assigning the workload; determining whether the parameter indicates that the scheduling hint is to be used for assigning the workload; and in response to determining that the parameter indicates that the scheduling hint is to be used, assign the workload to the hardware partition in view of the scheduling hint.

Example 27 is the method of any of Examples 23-26, wherein the parameter corresponds to one of the use of the scheduling hint being enabled, the use of the scheduling hint being disabled, or a hybrid use of the scheduling hint.

Example 28 is the method of any of Examples 23-27, wherein the parameter corresponds to the hybrid use of the scheduling hint and wherein the method further comprises: determining whether to assign the workload to the hardware partition in view of the scheduling hint and information received from other resource managers of the host system.

Example 29 is an apparatus comprising: means for receiving, from a client device, a request to execute a workload, the workload to utilize an amount of resources to be executed; means for receiving, from one or more host systems, corresponding resources that are available at a plurality of non-uniform memory access (NUMA) nodes at the one or more host systems; means for identifying a particular NUMA node of the plurality of NUMA nodes in view of the particular NUMA node having available resources that are greater than the amount of resources to execute the workload; and means for assigning a scheduling hint to the workload that indicates that the particular NUMA node is to be used to execute the workload.

Example 30 is the apparatus of Example 29, further comprising: means for generating one or more containers associated with the workload, wherein the one or more containers comprise the amount of resources associated with the workload and the scheduling hint.

Example 31 is the apparatus of any of Examples 29-30, further comprising: means for providing the one or more containers to a host system of the one or more host systems comprising the particular NUMA node to execute the workload.

Example 32 is the apparatus of any of Examples 29-31, wherein the scheduling hint causes the host system to assign the one or more containers to the particular NUMA node to execute the workload.

Example 33 is the apparatus of any of Examples 29-32, wherein each of the one or more host systems comprises two or more NUMA nodes.

Example 34 is the apparatus of any of Examples 29-33, wherein the corresponding resources are received from the one or more host systems via an application programming interface (API).

Example 35 is the apparatus of any of Examples 29-34, wherein the one or more host systems comprise a cloud computing environment.

Example 36 is the apparatus of any of Examples 29-35, wherein the resources comprise one or more of central processing unit (CPU) cores, random access memory (RAM), or peripheral component interconnect (PCI) devices.

Unless specifically stated otherwise, terms such as "receiving," "identifying," "assigning," "synchronizing," "generating," "providing," "binding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving, from a client device, a request to execute a workload, the workload to utilize an amount of resources to be executed;
    receiving, from one or more host systems, corresponding resources that are available at a plurality of non-uniform memory access (NUMA) nodes at the one or more host systems;
    identifying, by a processing device, a particular NUMA node of the plurality of NUMA nodes in view of the particular NUMA node having available resources that are greater than the amount of resources to execute the workload;
    assigning a scheduling hint to the workload that indicates that the particular NUMA node is to be used to execute the workload;
    identifying a parameter associated with enabling a use of the scheduling hint, wherein the parameter is operable to enable or disable the scheduling hint after the scheduling hint having been assigned to the workload; and
    executing the workload on a hardware partition according to the scheduling hint and the parameter.

2. The method of claim 1, further comprising:
    generating one or more containers associated with the workload, wherein the one or more containers comprise the amount of resources associated with the workload and the scheduling hint.

3. The method of claim 2, further comprising:
    providing the one or more containers to one of the one or more host systems comprising the particular NUMA node to execute the workload.

4. The method of claim 3, wherein the scheduling hint causes the one of the one or more host systems to assign the one or more containers to the particular NUMA node to execute the workload.

5. The method of claim 1, wherein each of the one or more host systems comprises two or more NUMA nodes.

6. The method of claim 1, wherein the corresponding resources are received from the one or more host systems via an application programming interface (API).

7. The method of claim 1, wherein the one or more host systems comprise a cloud computing environment.

8. The method of claim 1, wherein the resources comprise one or more of central processing unit (CPU) cores, random access memory (RAM), or peripheral component interconnect (PCI) devices.

9. A system comprising:
    a memory; and
    a processing device, operatively coupled to the memory, to:
        query an indication of resources of a plurality of hardware partitions that are available for execution of a workload;
        generate one or more containers associated with the workload to be executed, the one or more containers comprising a scheduling hint indicating a particular hardware partition to execute the workload;
        provide the one or more containers to a host system comprising the particular hardware partition for execution;
        identify a parameter associated with the scheduling hint, wherein the parameter is operable to enable or disable the scheduling hint after the scheduling hint having been assigned to execute the workload; and
        execute the workload according to the scheduling hint and the parameter.

10. The system of claim 9, wherein the particular hardware partition comprises a non-uniform memory access (NUMA) node.

11. The system of claim 9, wherein the particular hardware partition comprises a sub non-uniform memory access (NUMA) node.

12. The system of claim 9, wherein to generate the one or more containers associated with the workload, the processing device is further to:

identify the particular hardware partition to execute the workload in view of the resources of the particular hardware partition that are available to execute the workload.

13. The system of claim 9, wherein the processing device is further to:
receive, from a client device, a request to execute the workload, wherein the resources of the plurality of hardware partitions are provided in response to receiving the request.

14. The system of claim 9, wherein the host system comprises two or more hardware partitions.

15. The system of claim 14, wherein synchronizing the resources of the plurality of hardware partitions provides corresponding resources available for execution of the workload at each of the two or more hardware partitions.

16. The system of claim 9, wherein the scheduling hint causes the host system to assign the one or more containers to the particular hardware partition.

17. A non-transitory computer-readable storage medium including instructions that, when executed by a processing device of a host system, cause the processing device to:
receive, from a scheduling system, one or more containers associated with a workload to be executed by the host system, the host system comprising a plurality of non-uniform memory access (NUMA) nodes and the one or more containers comprising a scheduling hint indicating a NUMA node of the plurality of NUMA nodes that is to execute the workload;
assign, by the processing device, the one or more containers to the NUMA node in view of the scheduling hint;
identify a parameter associated with enabling a use of the scheduling hint, wherein the parameter is operable to enable or disable the scheduling hint after the scheduling hint having been assigned to the workload; and
execute the workload on the NUMA node of the plurality of NUMA nodes according to the scheduling hint and the parameter.

18. The non-transitory computer-readable storage medium of claim 17, wherein the processing device is further to:
provide, to the scheduling system, corresponding resources that are available to execute the workload for each of the plurality of NUMA nodes, wherein the one or more containers associated with the workload are received in response to providing the corresponding resources.

19. The non-transitory computer-readable storage medium of claim 18, wherein the corresponding resources are provided to the scheduling system via an application programming interface (API).

20. The non-transitory computer-readable storage medium of claim 17, wherein to assign the one or more containers to the NUMA node in view of the scheduling hint, the processing device is further to:
determine whether the parameter indicates that the scheduling hint is to be used for assigning the one or more containers; and
in response to determining that the parameter indicates that the scheduling hint is to be used, assign the one or more containers to the NUMA node in view of the scheduling hint.

* * * * *